US012167716B2

(12) United States Patent
Smith

(10) Patent No.: US 12,167,716 B2
(45) Date of Patent: Dec. 17, 2024

(54) ANIMAL COLLAR ASSEMBLY

(71) Applicant: CERES TAG PTY LTD, Samford (AU)

(72) Inventor: David Ian Smith, Samford (AU)

(73) Assignee: CERES TAG PTY LTD, Samford (AU)

( * ) Notice: Subject to any disclaimer, the term of this patent is extended or adjusted under 35 U.S.C. 154(b) by 180 days.

(21) Appl. No.: 17/917,804

(22) PCT Filed: Apr. 7, 2021

(86) PCT No.: PCT/AU2021/050319
§ 371 (c)(1),
(2) Date: Oct. 7, 2022

(87) PCT Pub. No.: WO2021/203166
PCT Pub. Date: Oct. 14, 2021

(65) Prior Publication Data
US 2023/0345907 A1  Nov. 2, 2023

(30) Foreign Application Priority Data

Apr. 7, 2020 (AU) .................. 2020901133

(51) Int. Cl.
*A01K 11/00* (2006.01)
*A01K 15/02* (2006.01)
(Continued)

(52) U.S. Cl.
CPC .......... *A01K 11/008* (2013.01); *A01K 15/023* (2013.01); *A01K 27/001* (2013.01); *A01K 27/009* (2013.01); *A01K 29/005* (2013.01)

(58) Field of Classification Search
CPC .. A01K 27/001; A01K 27/002; A01K 27/009; A01K 27/005; A01K 15/021;
(Continued)

(56) References Cited

U.S. PATENT DOCUMENTS 6,805,460 B1 * 10/2004 Zoller .................. A01K 27/006
362/103
2006/0102100 A1 * 5/2006 Becker .................. A01K 27/009
119/720
(Continued)

FOREIGN PATENT DOCUMENTS

EP  3649856 A1  5/2020
EP  4061121 A1  9/2022
(Continued)

OTHER PUBLICATIONS

Extended Search Report issued on Aug. 11, 2023, in corresponding European Application No. 21784899.3, 11 pages.
(Continued)

*Primary Examiner* — Magdalena Topolski
*Assistant Examiner* — Brook Victoria Schmid
(74) *Attorney, Agent, or Firm* — Maier & Maier, PLLC

(57) ABSTRACT

An animal collar assembly for monitoring the animal's behaviour and/or animal's health and/or animal's location, the collar comprising: an electronic module comprising a housing for enclosing electronic componentry therein, the electronic module comprising a first coupling arrangement for coupling to a collar strap adapted to be passed around a neck region of the animal; and a counterweight module having a weight that equal to or greater than weight of the electronic module, the counterweight module comprising a second coupling arrangement for coupling the counterweight module to the collar strap adapted to be passed around a neck region of the animal.

19 Claims, 14 Drawing Sheets

(51) Int. Cl.
*A01K 27/00* (2006.01)
*A01K 29/00* (2006.01)

(58) Field of Classification Search
CPC .... A01K 15/022; A01K 15/023; A01K 29/00; A01K 29/005; A01K 15/029; A01K 27/00; A01K 15/00; A01K 15/02; A01K 11/00; A01K 11/008; A01K 11/006
See application file for complete search history.

(56) References Cited

U.S. PATENT DOCUMENTS

| | | | |
|---|---|---|---|
| 2007/0221140 | A1 | 9/2007 | Warren et al. |
| 2008/0163827 | A1* | 7/2008 | Goetzl ................ A01K 15/021 119/859 |
| 2012/0073517 | A1* | 3/2012 | Dukes ................ A01K 27/008 119/858 |
| 2013/0157628 | A1 | 6/2013 | Kim et al. |
| 2013/0305491 | A1* | 11/2013 | Sayers ................ A01K 27/005 24/3.4 |
| 2014/0182519 | A1 | 7/2014 | Tupin, Jr. |
| 2014/0290013 | A1* | 10/2014 | Eidelman ............ A01K 27/008 24/593.1 |
| 2015/0099472 | A1* | 4/2015 | Ickovic ............... H04W 64/006 455/66.1 |
| 2016/0072324 | A1* | 3/2016 | Touchton ............... G01R 31/50 320/137 |
| 2016/0205894 | A1 | 7/2016 | Kim et al. |
| 2018/0064068 | A1 | 3/2018 | McKee et al. |
| 2018/0098525 | A1* | 4/2018 | Lee ....................... A01K 27/008 |
| 2018/0153137 | A1* | 6/2018 | Goetzl ................. A01K 27/001 |
| 2019/0133084 | A1* | 5/2019 | Landers ............. G08B 21/0269 |
| 2022/0000074 | A1* | 1/2022 | Mott, Jr. .............. A01K 27/008 |
| 2022/0151207 | A1* | 5/2022 | Mott .................... A01K 11/008 |

FOREIGN PATENT DOCUMENTS

| | | |
|---|---|---|
| FR | 3011440 A1 | 4/2015 |
| KR | 20200006471 A * | 1/2020 |
| WO | 2019209712 A1 | 10/2019 |
| WO | WO-2021016653 A1 * | 2/2021 ........... A01K 11/008 |

OTHER PUBLICATIONS

International Search Report and written opinion issued on Jun. 15, 2021 in corresponding International Application No. PCT/AU2021/050319; 14 pages.

* cited by examiner

ANIMAL COLLAR ASSEMBLY

TECHNICAL FIELD

The present invention relates an animal collar such as but not limited to a dog collar or a cat collar for monitoring the location, health and behavioural parameters of a pet animal.

BACKGROUND

Any references to methods, apparatus or documents of the prior art are not to be taken as constituting any evidence or admission that they formed, or form part of the common general knowledge.

Collars that can monitor the health and behavioural characteristics of an animal are well known. Similarly collars that can be used for monitoring the location of an animal are also well known. However, collars that combine these functions together are not very practical simply because such devices have high power requirements. Using rechargeable batteries for powering such devices is a practical option. However, even the use of rechargeable batteries using relatively bulky battery packs necessitates frequent or daily recharging. Moreover, devices requiring frequent recharging are impractical especially if an animal escapes a fenced property and is not located before the rechargeable battery gets discharged. As a result, there is a need for an improved animal collar assembly which can monitor the health and behavioural characteristics of a beloved pet animal such as a dog or a cat and can still provide location details of the animals if they escape from a fenced property over extended periods of time until the animal is successfully located.

Another important issue relates to the physical construction of currently known animal collar assemblies. Most smart animal collars include an electronic module which is relatively heavy and is attached to a collar strap that passes around the animal's neck. With most of such electronic collars, even after the strap is adjusted and tightened, any prolonged movement or shaking by the dog results in the electronic module slipping down (due to gravitational effect acting on the heavy electronic module) from the behind the ear recommended position to nearly the middle of the neck. The location of the electronic module especially for electronic collars used for location tracking is important because the lowered position of the location sensors along the neck region can significantly impede signal reception (from GPS satellites) for the electronic module. To some extent, this issue can be addressed by tightening the collar strap further but a highly tensioned collar strap can be uncomfortable and dangerous for some domestic animals like cats and dogs. It is therefore be desirable to address this issue by providing an improved animal collar assembly.

SUMMARY OF INVENTION

In an aspect, the invention provides an animal collar assembly for monitoring the animal's behaviour and/or animal's health and/or animal's location, the collar comprising:

an electronic module comprising a housing for enclosing electronic componentry therein, the electronic module comprising a first coupling arrangement for coupling to a collar strap adapted to be passed around a neck region of the animal;

a counterweight module having a weight that equal to or greater than weight of the electronic module, the counterweight module comprising a second coupling arrangement for coupling the counterweight module to the collar strap adapted to be passed around a neck region of the animal.

In an embodiment, the first coupling arrangement and/or the second coupling arrangement allows the counterweight module and the electronic modules to be coupled at spaced apart coupling locations along the length of the collar strap.

In an embodiment, the housing for the electronic module comprises a pair of opposed slots for receiving the collar strap therein such that twisting the electronic module in a clock-wise or anti-clockwise direction uncouples the electronic module from the collar strap.

In an embodiment, each of said opposed slots is defined by a tab member spaced away from a portion of the electronic module housing.

In an embodiment, the electronic module comprises one or more probes, said probes being positioned on the housing such that upon coupling of the electronic module with the collar strap, the probes are arranged to directly contact the body of the animal for sensing one or more health parameters of the In an embodiment, an outer surface of one or more said tab members comprises one or more of the probes for contacting the skin of the animal when coupled with the collar strap.

In an embodiment, the animal collar assembly comprises a rechargeable battery for powering electronic componentry in the electronic module and wherein each of the probes further comprises a connector for electrically connecting the rechargeable battery to a charging device.

In an embodiment, the first coupling arrangement further comprises a coupling member with a locking formation for receiving and coupling the housing of the electronic module.

In an embodiment, the housing comprises a recessed portion for receiving and locking the locking formation of the first coupling arrangement.

In an embodiment, the electronic module is fixedly attached to the collar strap to prevent relative movement between the collar strap and the electronic module.

In an embodiment, the counterweight module comprises an outer surface adapted to display information or indicia related to the animal.

In another aspect, the invention provides an animal collar assembly comprising an electronic module wherein the electronic module comprises a Tracking device configured to wirelessly transmit animal location data from the electronic module to a remotely located device to provide remote animal location tracking capability for the remotely located device.

In an embodiment, the Tracking device is configured to be operationally inactive when the electronic module of the collar assembly is located within a pre-defined containment area.

In an embodiment, the electronic module comprises a microprocessor that is operable in a normal containment operating mode to communicate information related to the animal behaviour whilst the Tracking device is operationally inactive.

In an embodiment, the microprocessor is in communication with a local short range transmission device to wirelessly transmit the information related to the animal behaviour wirelessly to a receiving device located within the containment area.

In an embodiment, the microprocessor is operable in a low power GPS mode to process and transmit animal location related data when the electronic module of the collar assembly is located outside the pre-defined containment area.

In an embodiment, the Tracking device comprises a satellite transmitter arranged to be in communication with the microprocessor to transmit signals to one or more low earth orbit (LEO) satellites.

In an embodiment, the satellite transmitter transmits one-way data messages in relation to animal location from the electronic module to the one or more low earth orbit satellites.

In an embodiment, the animal collar assembly further comprises a sensory array with one or more sensor elements in communication with the microprocessor, the sensor array including at least an accelerometer sensor, the accelerometer configured to measure at least one accelerometer-measured parameter of the animal from among: resting patterns, activity patterns, movement patterns and position patterns.

In an embodiment, the sensor array further comprises at least one non-accelerometer sensor configured to measure at least one of the following non-accelerometer-measured parameters of the animal: temperature, pulse rate, respiration rate.

In an embodiment, one or more local or remotely located processors are configured to receive data related to measured parameters of the animal from the sensory array and process said data by comparing the measured parameters with reference data to determine a likelihood of a specific health related condition in the animal and providing an indication of said likelihood on a display provided on the collar housing or on a remotely located device in communication with said electronic module.

In an embodiment, the determination of likelihood of the specific health related condition of the animal is carried out by comparing the measured parameters with one or more pre-set or predetermined threshold values. In some embodiments, the threshold values may be saved on the memory device in communication with the processor. In other alternative embodiments, the pre-set values may be set by the user through use of a user input interface in communication with the processor and the memory device.

In an embodiment, the local or remotely located processors are configured to communicate with a user input interface for receiving user input to program measurement of one or more of said health related parameters.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
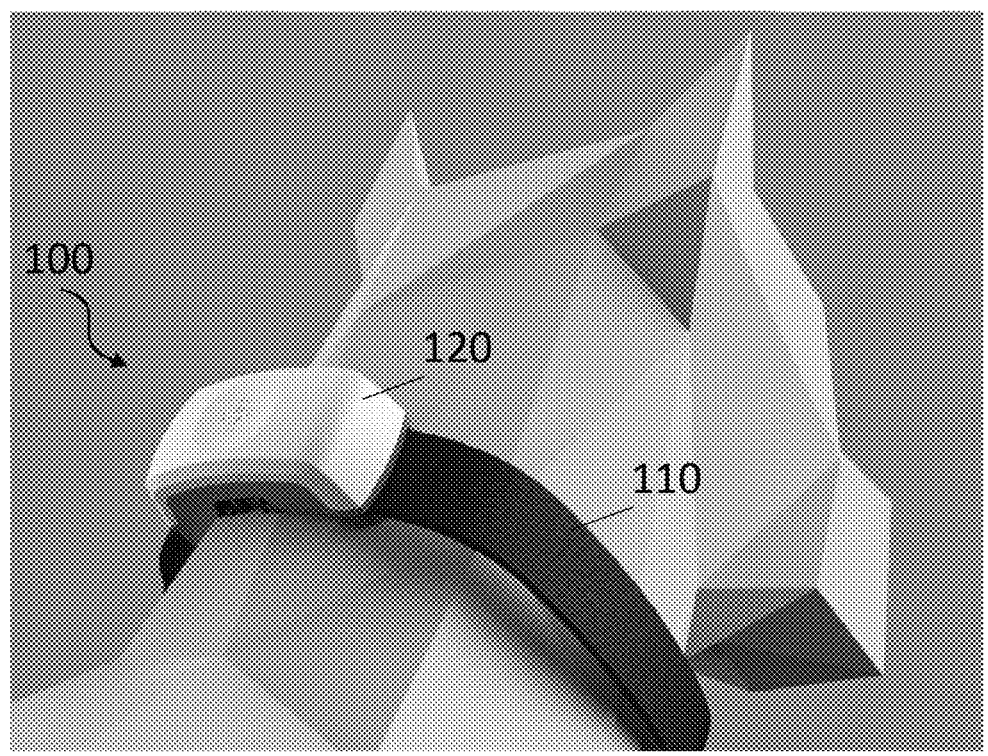
FIG. 1 is an in-use dorsal view of the animal collar assembly 100.
Figure 2:
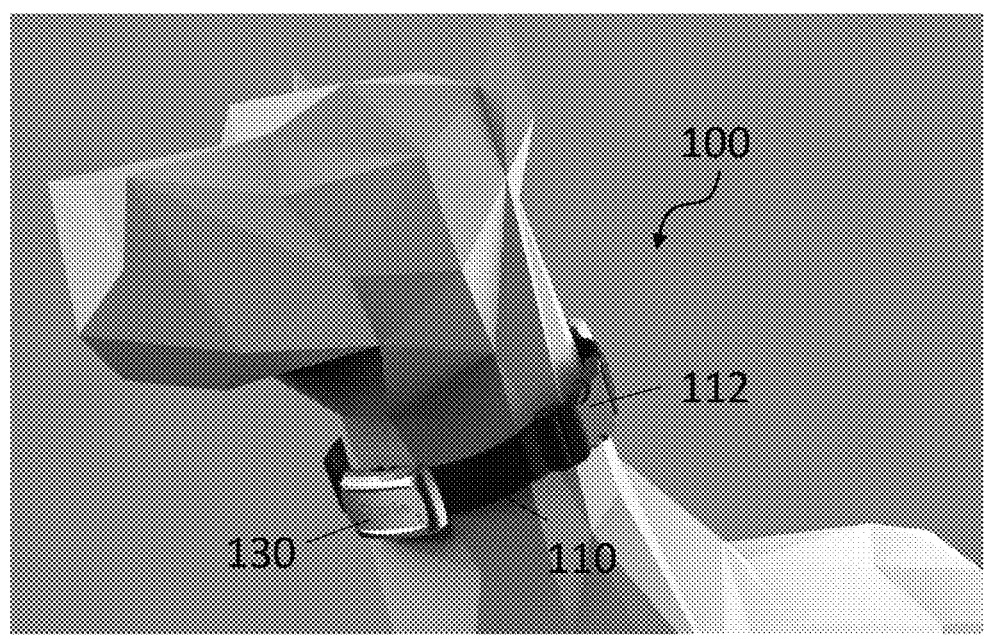
FIG. 2 is an in-use ventral view of the animal collar assembly 100.
Figure 3:
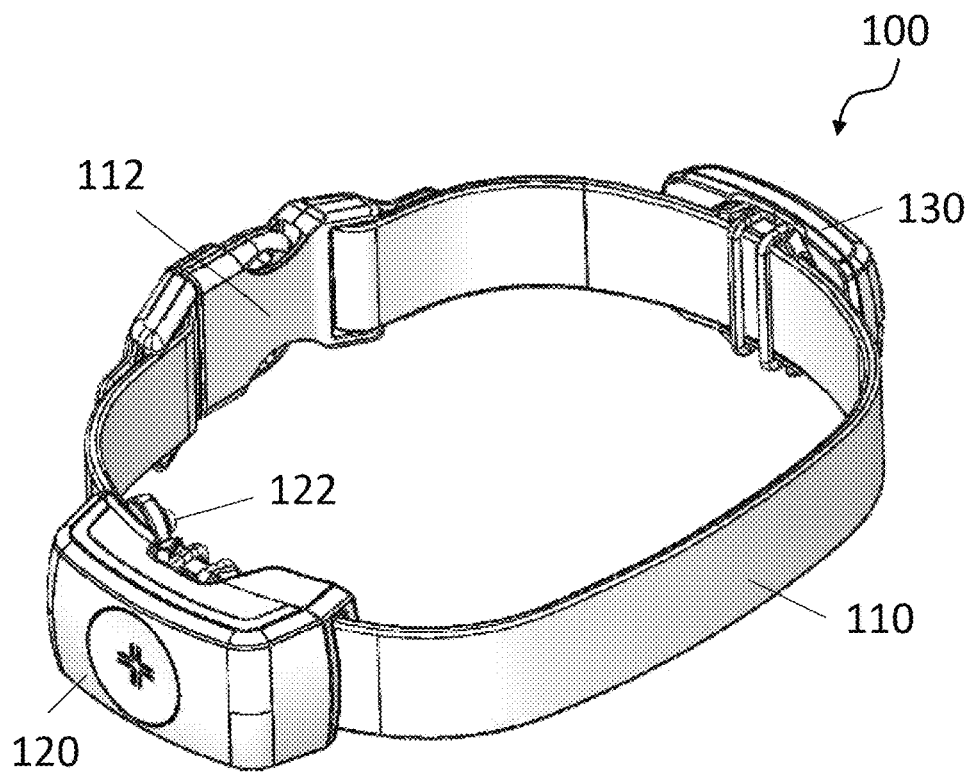
FIG. 3 is a top perspective view of the animal collar assembly 100.
Figure 4:
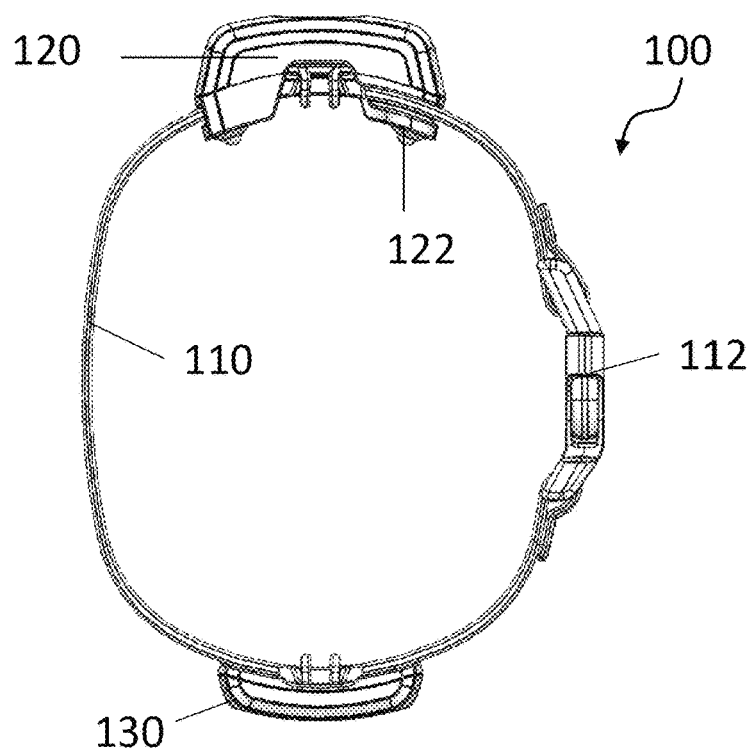
FIG. 4 is a top view of the animal collar assembly 100.
Figure 5:
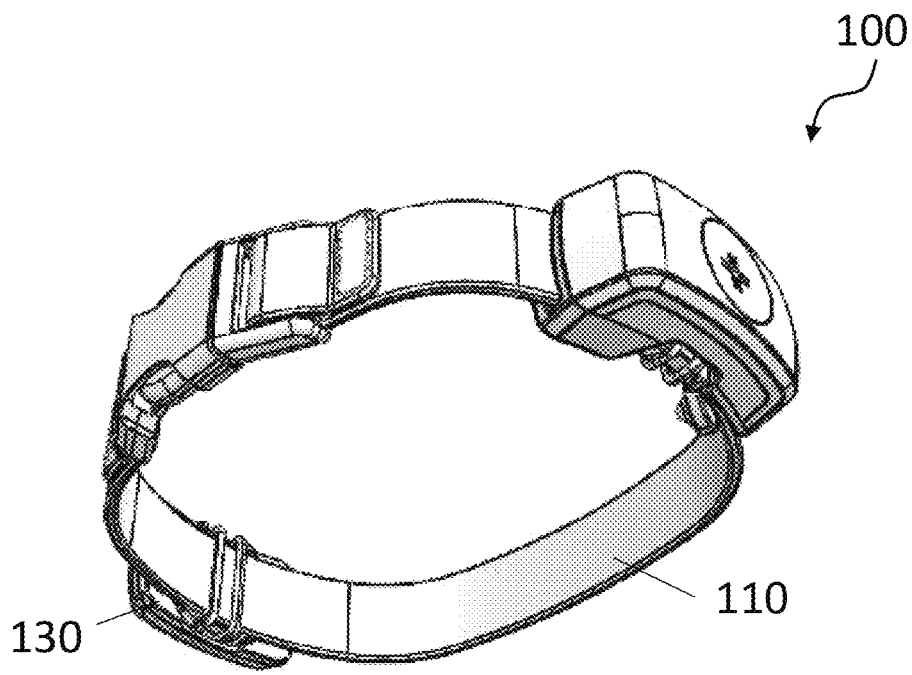
FIGS. 5 to 10 illustrate several perspective views of the collar assembly 100.
Figure 6:
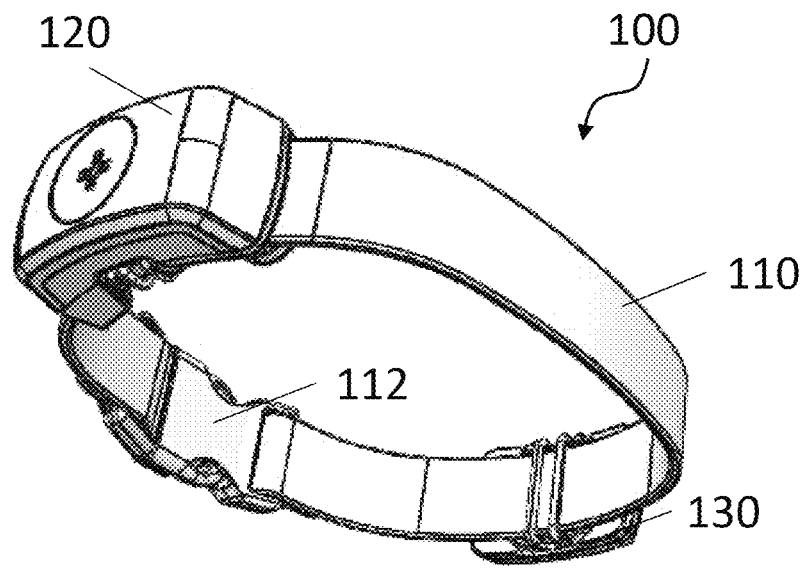
Figure 7:
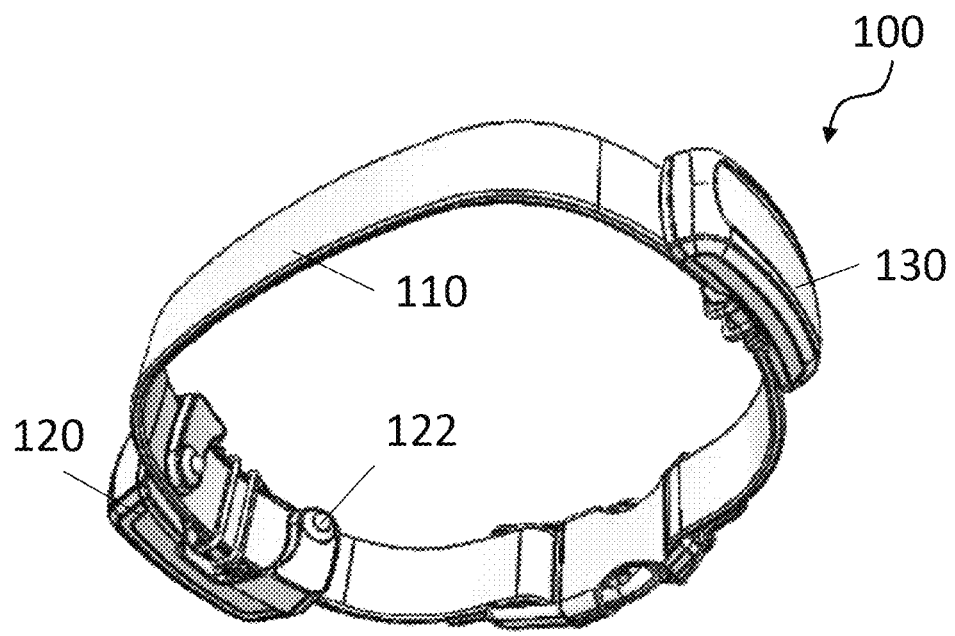
Figure 8:
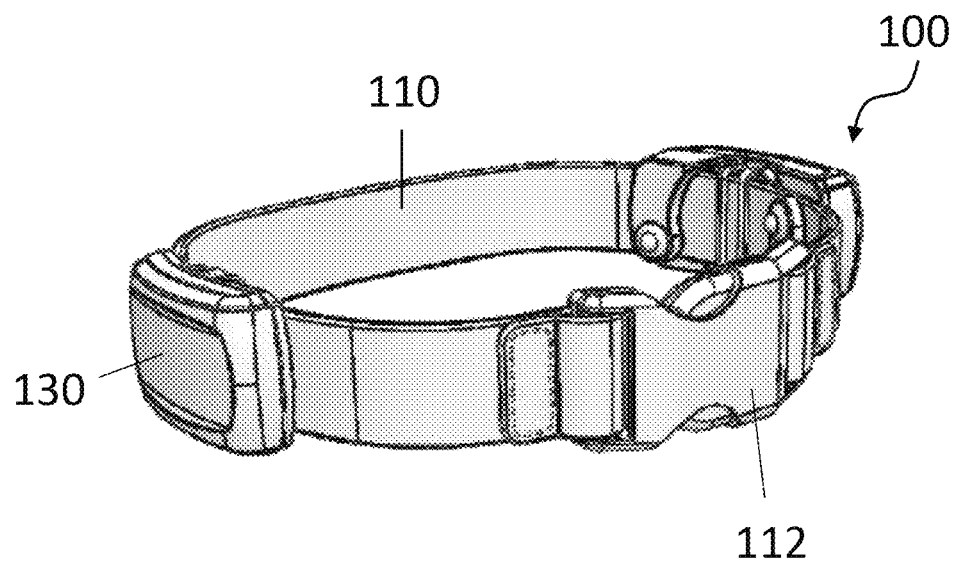
Figure 9:
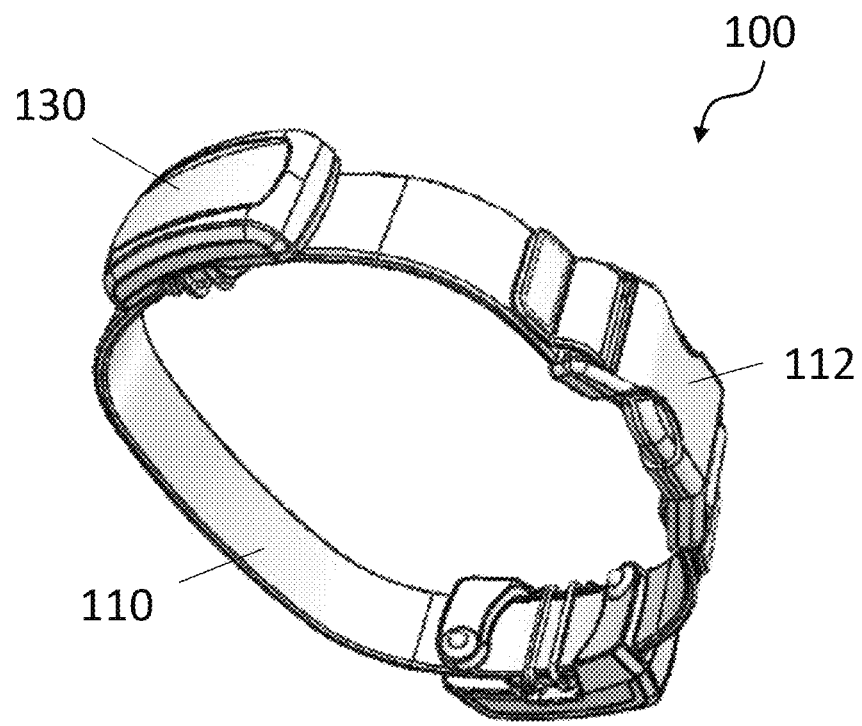
Figure 10:
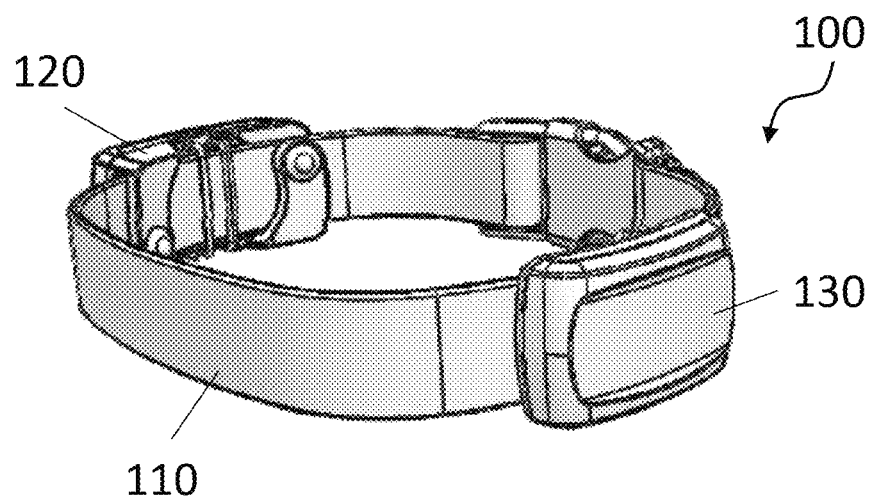
Figure 11:
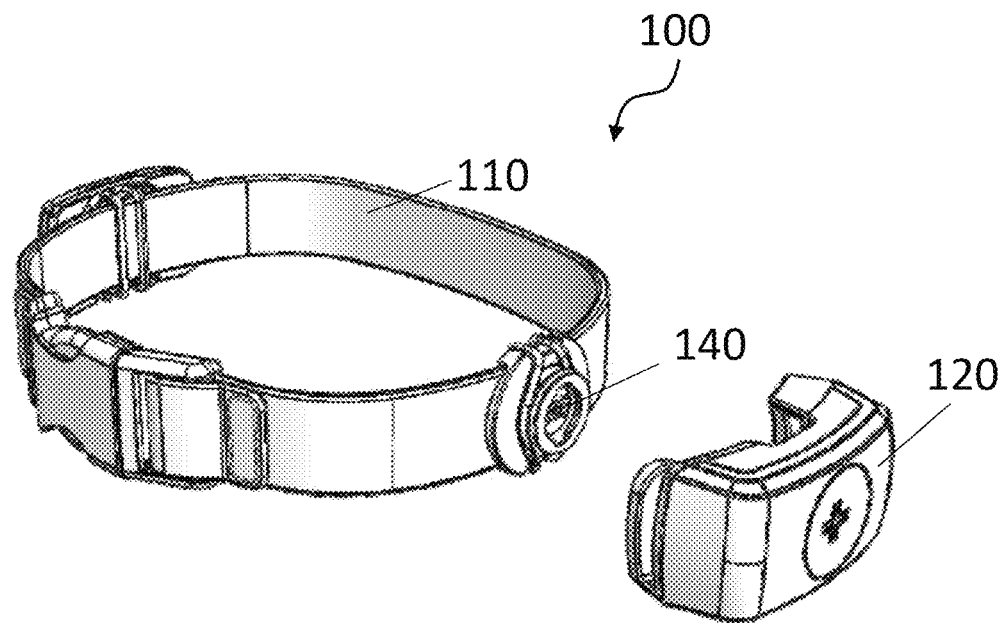
FIGS. 11 to 14 illustrate perspective views of the collar assembly 100 where the electronic module 120 is uncoupled from the collar strap 110 of the collar assembly 100.
Figure 12:
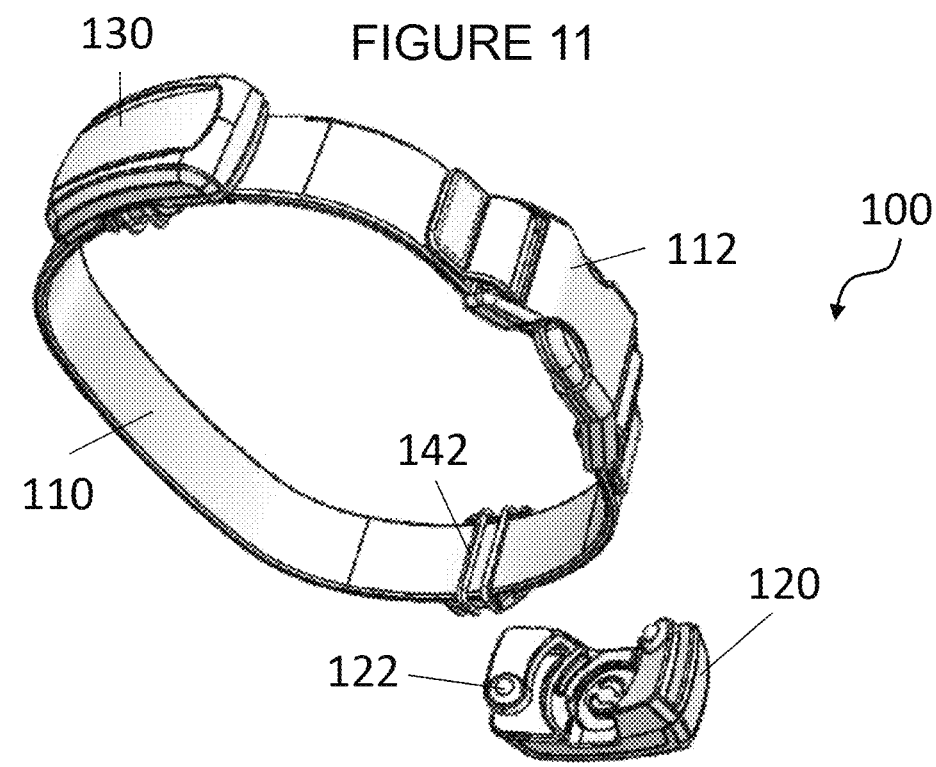
Figure 13:
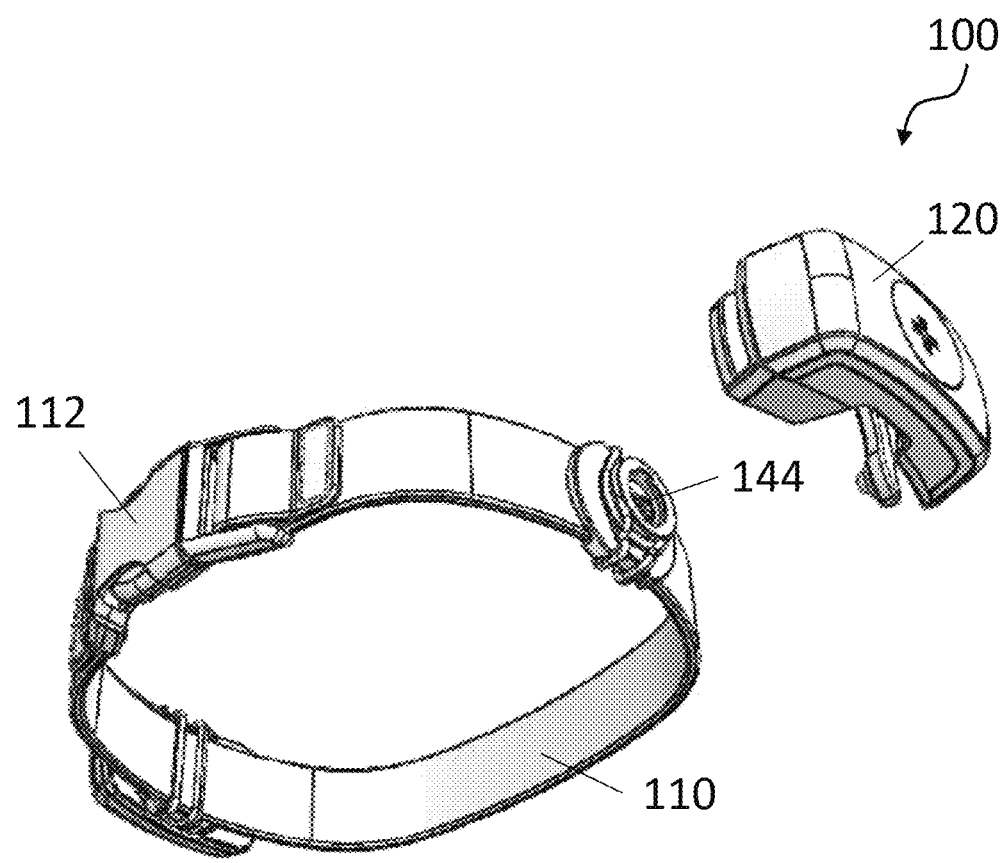
Figure 14:
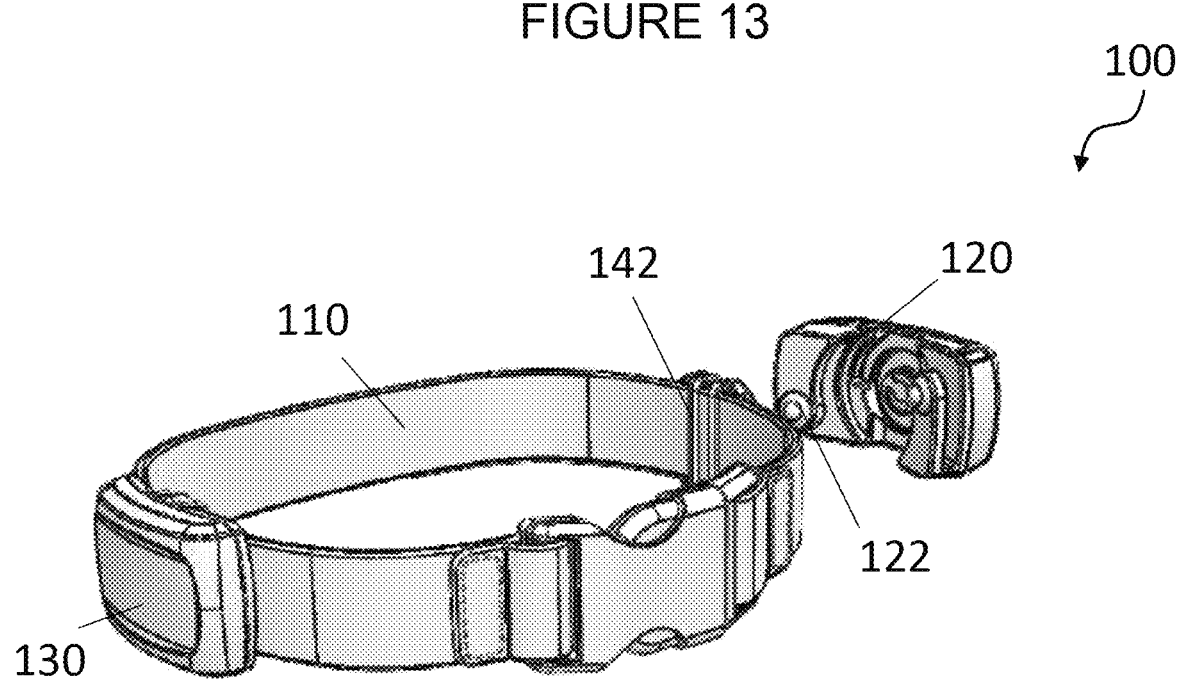

FIGS. 1 to 14 illustrate an animal collar assembly 100 in accordance with an embodiment of the present invention. The animal collar assembly 100 may be suitable for monitoring the animal's behaviour and/or health and/or location. In the presently described embodiment, the animal collar assembly 100 is configured for performing a plurality of monitoring and tracking functions which will be explained the in the foregoing sections. The collar assembly 100 has been described with reference to being used as a dog collar. However, it would be understood that the collar assembly 100 may be used for similar monitoring and tracking other pet animals such as domestic cats without departing from the scope of the invention.

The collar assembly 100 includes a flexible strap 110 that can be passed around the animal's neck region and suitably tightened. The strap may be made from any suitable synthetic or natural material such as nylon or leather and formed as a continuous loop. Alternatively a buckle such as buckle 112 may also be provided to fasten two ends of the strap 110 together to achieve a closed configuration. The collar assembly 100 includes an electronic module 120 which is coupled to the strap 110 via a coupling arrangement. The electronic module 120 may include animal contacting probes 122 for contacting the animal's skin whilst the electronic module 120 is fixedly coupled to the strap 110.

As shown best in FIG. 1, during use, it is considered desirable if not ideal to maintain the location of the electronic module 120 behind (or above) the ears of the animal such that the electronic module 120 is substantially equidistant from each ear of the animal. The mounting location of the electronic module 120 is substantially maintained by providing a counterweight module 130 that is also coupled with the strap 110 at a spaced apart location from the electronic module 120 in a manner such that during use, the counterweight module 130 is located along a ventral region of the animal's body. Advantageously, the inventor has found that providing the counterweight module 130 that has a weight that is at least substantially equal to or preferably greater than the weight of the electronic module 120 causes the heavier counterweight module 130 to be maintained at a ventral region of the animal's body as a result of which the relatively lighter electronic module 120 remains behind the animal's ears along a dorsal portion of the animals' body even during prolonged periods of use. Maintaining the position of the electronic module 120 improves connectivity between transmitters in the electronic module 120 and any satellites as will be explained in further detail. Therefore, providing the counterweight module 130 prevents the electronic module 120 from slipping towards a ventral region of the animal's body. The counterweight module 130 may be utilised for performing other secondary functions. In one useful embodiment, the counterweight module 130 may be provided with an outwardly visible surface to provide useful indicia such as (but not limited to) the animal's name to assist in correctly identifying the animal. Other useful information in relation to the pet animal's owner may also be provided on the outer surface of the counterweight module.

Figure 15:
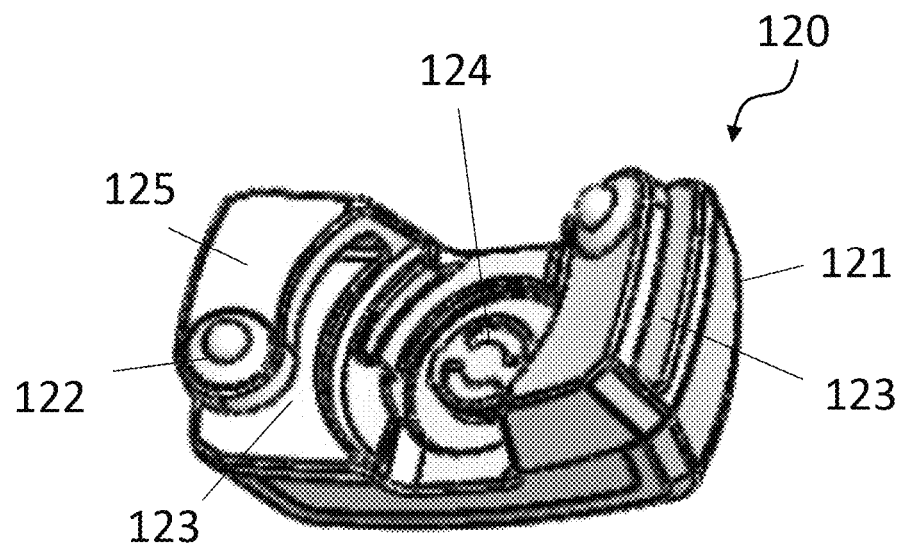
FIG. 15 is an isolated underside view of the electronic module 120.
Figure 16:
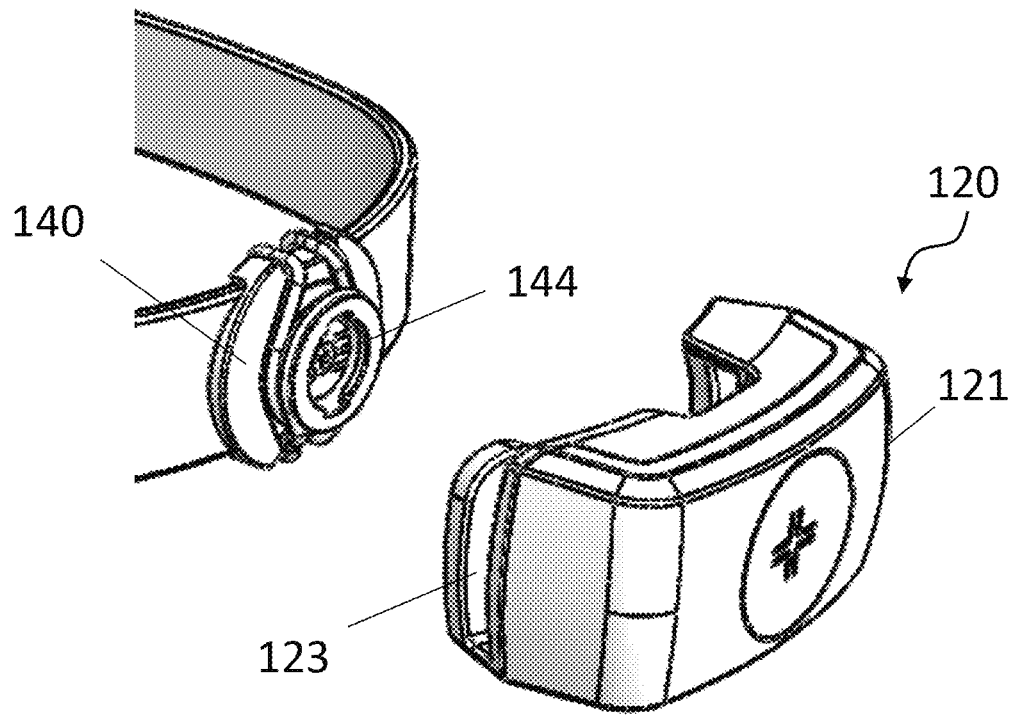
FIG. 16 is an enlarged perspective view of the coupling member 140 and the electronic module 120 in an uncoupled configuration.

Turning to the electronic module 120 as shown clearly in FIG. 15, the module comprises a housing 121 within which several electronic components are housed. The function of these electronic components will be discussed in the foregoing sections. The housing 121 also comprises a pair of opposed slots 123 for receiving the collar strap 110. Each slot 123 is defined by a tab member 125 that is sufficiently spaced away from a portion of the electronic module housing 121 to allow the thickness of the collar strap 110 to be received. Each slot 123 has a respective opening and the openings are located on opposed sides of the housing to allow the collar strap 110 to be easily received by imparting a clockwise or anti-clockwise twisting movement to the housing 121 to allow the collar strap 110 to be easily received. The advantage of this configuration of tabs 125 is that an outer surface of the tabs 125 can include the probes 122 that can press onto the animal's skin on the dorsal region and assess one or more health parameters (as discussed in detail in the foregoing sections).

The coupling arrangement for the electronic module 120 also includes a coupling member 140 that is affixed to the collar strap 110. The coupling member 140 includes a receiving portion 142 for receiving the collar strap 110 and a locking formation 144 for receiving and coupling with the electronic module housing 121. In the preferred embodiment, the module housing 121 includes a recessed locking portion 124 (located in between the tabs 125) with locking channels that cooperate with the locking formation 144 of the coupling member such that twisting the module housing 121 in a clockwise or anti-clockwise direction results in the locking channels receiving the locking formation 144 of the coupling member 140. It would be understood that this manner of coupling the module housing 121 with the coupling member 140 is not limiting. For example, in alternative embodiments, the locking formations might be provided within the recessed locking portion 124 and locking channels may be provided in the coupling member 140 without departing from the scope of the invention as described.

It is important to note that the flexible strap 100 does not form an essential part of the assembly 100 and in many embodiments, the assembly 100 may be provided as a kit containing the electronic module 120 and the counterweight module 130 with direction to a user to source a flexible collar strap such as strap 110 that is suitable for use with the electronic module 120 and the counterweight module 130 as has been described in the previous sections.

Figure 17:
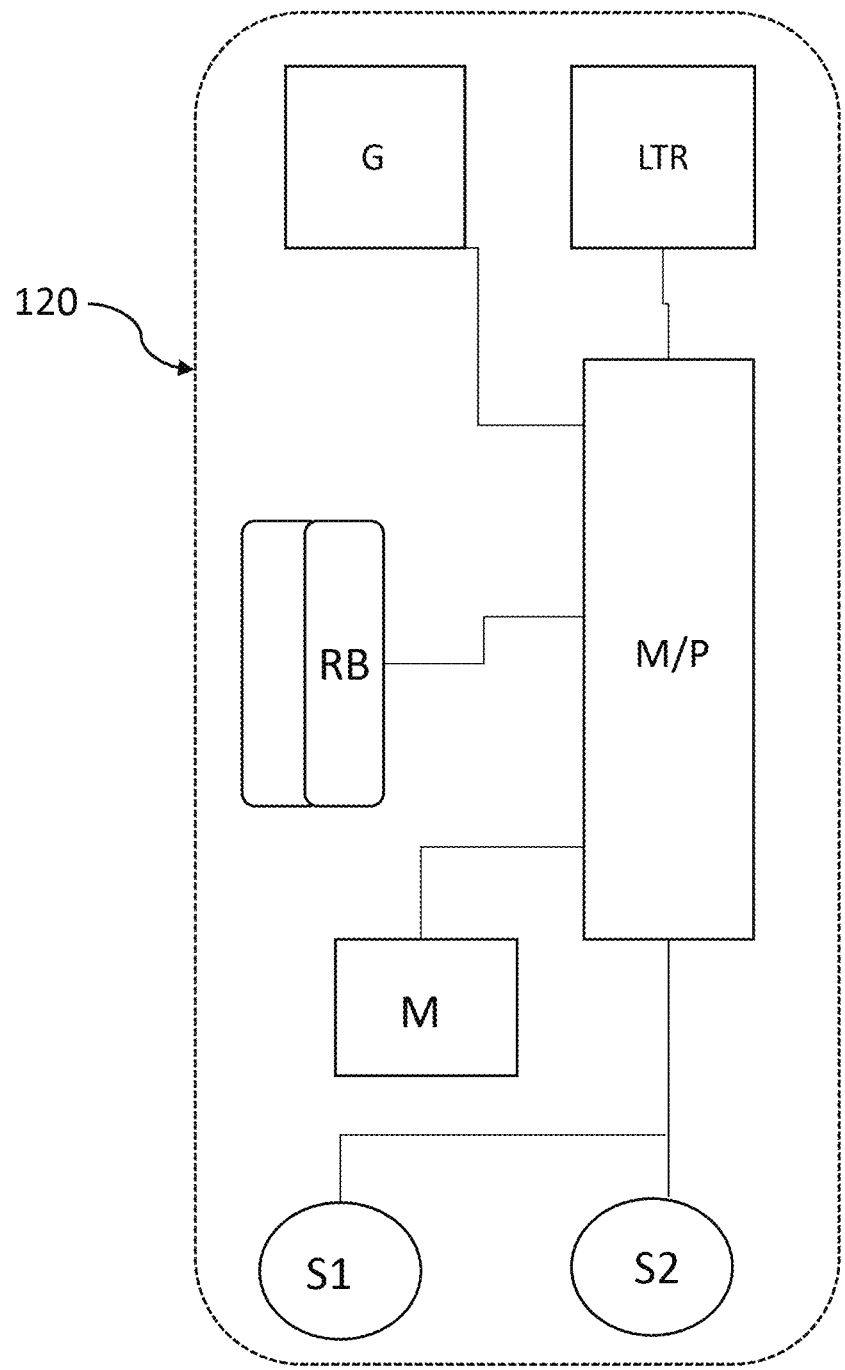
FIG. 17 is a schematic view of the electronic module 120 showing various electronic components of the electronic module 120.
Figure 18:
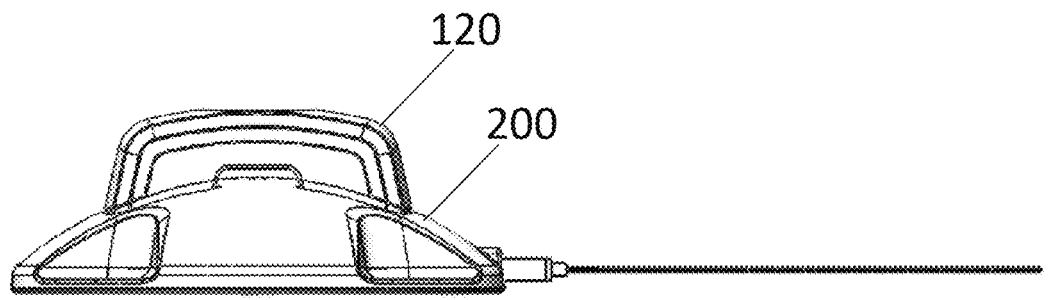
FIGS. 18 to 22 illustrate several views of a docking station 200 adapted for being connected with the electronic module 120.
Figure 19:
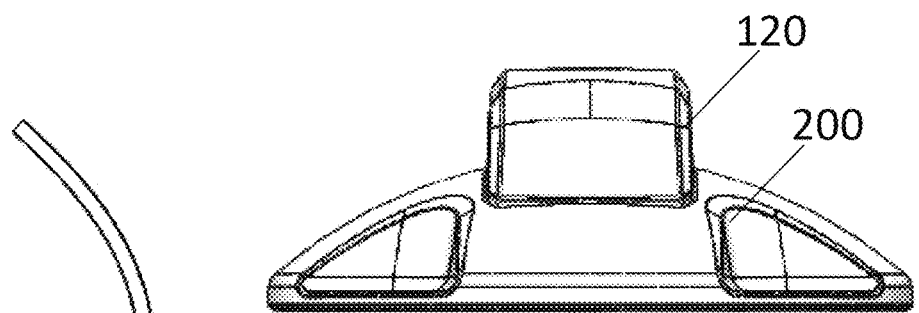
Figure 20:
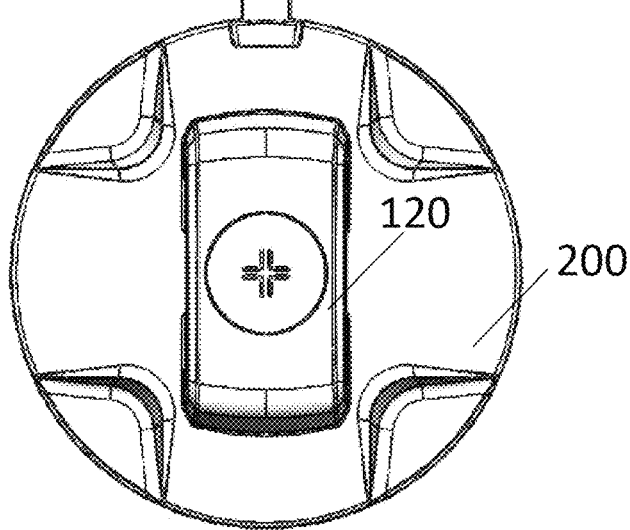
Figure 21:
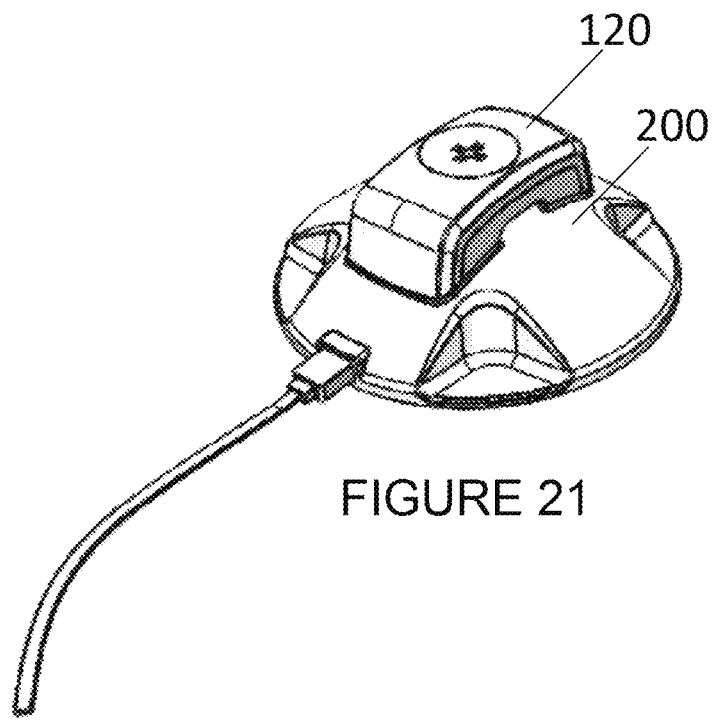
Figure 22:
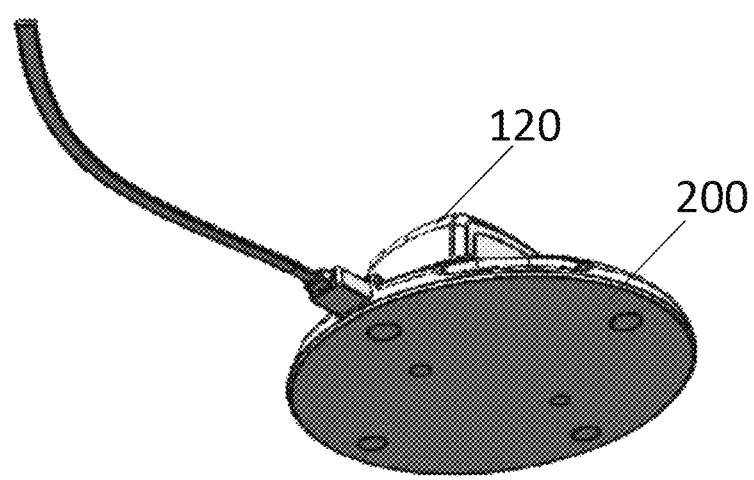
Figures 23, 24:
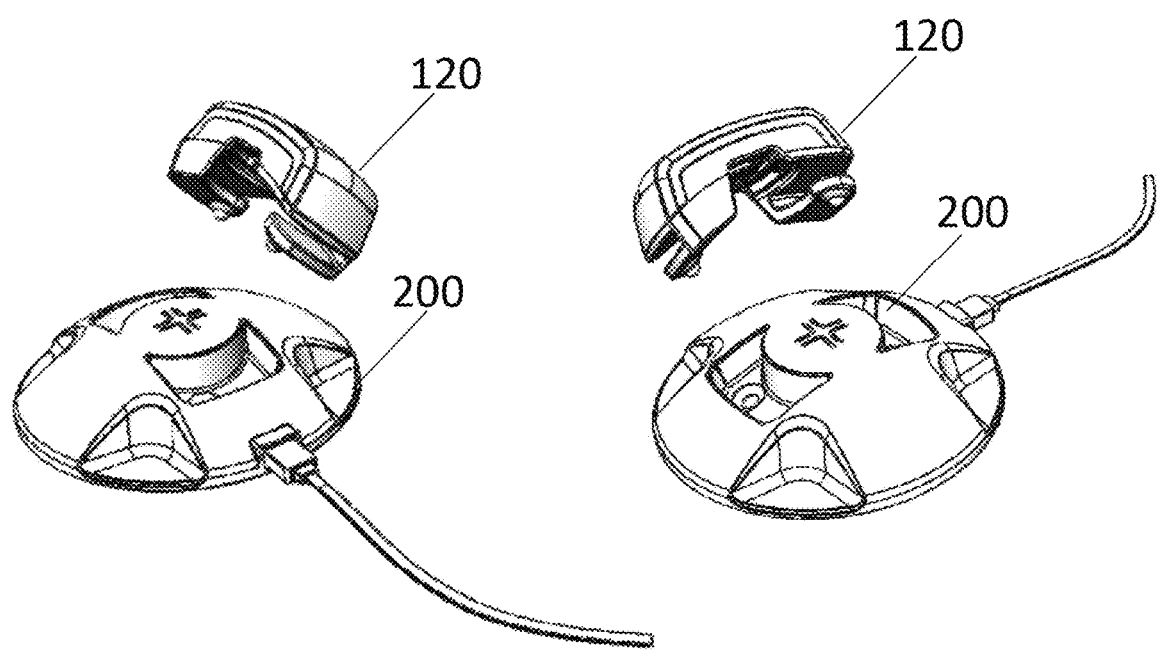
FIGS. 23 to 25 illustrate the docking station 200 and the electronic module 120 being shown in an uncoupled configuration.
Figure 25:
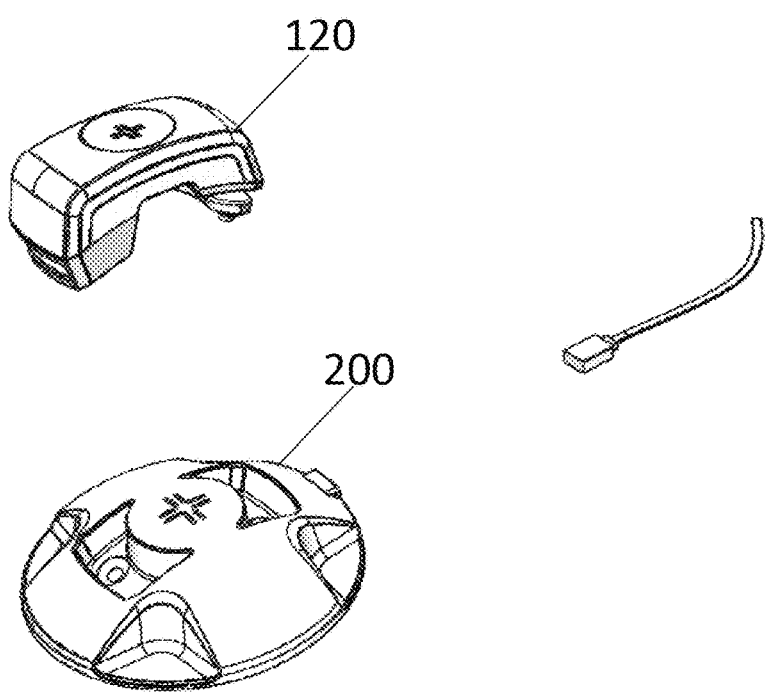

Turning to FIGS. 17, the electronic module 120 comprises several electrical components including a microprocessor (M/P) which is in communication with an on-board non-volatile memory device (M). The microprocessor (M/P) is adapted for short-range wireless communication with a docking station 200 via a trans-receiver (TR) that is arranged to be operatively coupled with the microprocessor (M/P). As shown particularly well in FIG. 26, the docking station 200 is continuously in communication with the electronic module 120 (mounted on the animal) when the animal is within a predefined containment zone (Z). In short, the trans-receiver (TR) periodically communicates with the docking station 200 to determine and confirm if the animal is within the pre-defined containment zone (Z). Such a mode of operation may deemed to a first operating configuration and may be referred to as a "containment mode" throughout the specification. The electronic module 120 may also house a battery pack comprising rechargeable batteries RB which may be recharged on a periodic basis.

During operation in the containment mode, the microprocessor (M/P) may receive sensory data from an array of sensors such as (but not limited to) S1 and S2 in communication with the microprocessor (M/P). The sensor array may include an accelerometer and a non-accelerometer sensor, the accelerometer configured to measure at least one accelerometer-measured bioparameter of the pet animal from among: resting patterns, activity patterns, movement patterns, position patterns, noise and sound patterns, lameness and scratching, and the non-accelerometer sensor configured to measure at least one of the following non-accelerometer-measured bioparameters of the pet animal: temperature, pulse rate, respiration rate. The at least two sensor elements may comprise at least three or at least four or at least five or at least six or at least seven (or more) sensor elements distributed at different locations within the electronic module housing 121. The on board microprocessor (M/P) may receive data values from the one or more sensors (S1, S2) of the sensor array and compare these values with reference data to determine a likelihood of a specific health related condition in the animal and providing an indication of said likelihood on a display provided on the collar housing or on a remotely located device such as the docking station 200 or a remotely located device (such as a mobile computing device including a smartphone or tablet or any other computing device) in communication with said electronic module 120. In this regard, the remotely located device may communicate directly with the docking station 200 via the internet or any other communication network. In some instances, the on-board memory device M may include some reference values for comparison with data received from the sensors S1 and S2. In other scenarios, the sensor data may be transmitted to the docking station 200 via the trans-receiver (TR) and comparative processing may be carried at a remote processing location by utilising server or computers communicating with the docking station 200.

The docking station 200 may be used for updating the firmware installed on the microprocessor (M/P). The updates may be carried out by either transferring one or more update files from the docking station 200 whilst the electronic module 120 is docked on the docking station 200. Alternatively or additionally, the updates from the docking station 200 may be transmitted to the electronic module 120 wirelessly.

FIGS. 18 to 25 illustrate several views of a non-limiting embodiment of a docking station 200. As explained in the earlier section, the docking station 200 may be positioned within a set containment area for periodic and continuous communication with the electronic module 120 during use of the animal collar assembly 120 in the containment mode. The docking station 200 may also include a docking portion for receiving the tabs 125 and establishing an electrical connection with the probes 122 to allow the rechargeable batteries RB of the electronic module 120 to be recharged. In the preferred embodiment, the docking station 200 is provided with a module receiving portion 220 for accommodating the tabs 125 during charging to ensure that the electronic module 120 is properly engaged with the docking station 200. It would be understood that the invention is no way limited by the provision of the docking station 200. In some embodiments, the electronic module 120 may readily communicate with a computing device (such as mobile phone) located within the pre-defined containment zone Z. In some embodiments, a small solar panel module may be coupled with the rechargeable batteries to assist with recharging the batteries RB.

Figure 26:
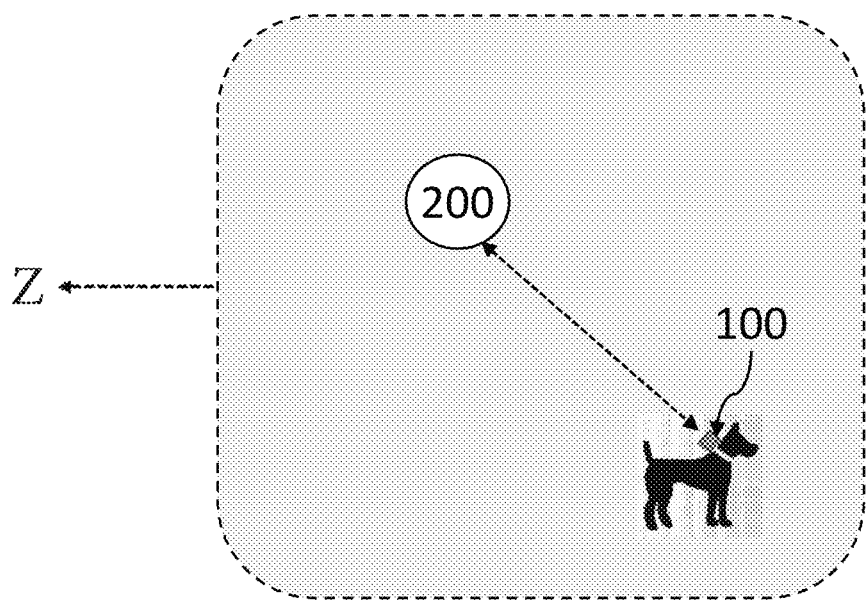
FIG. 26 is a schematic illustration of the collar assembly 100 shown during use in a containment zone Z.
Figure 27:
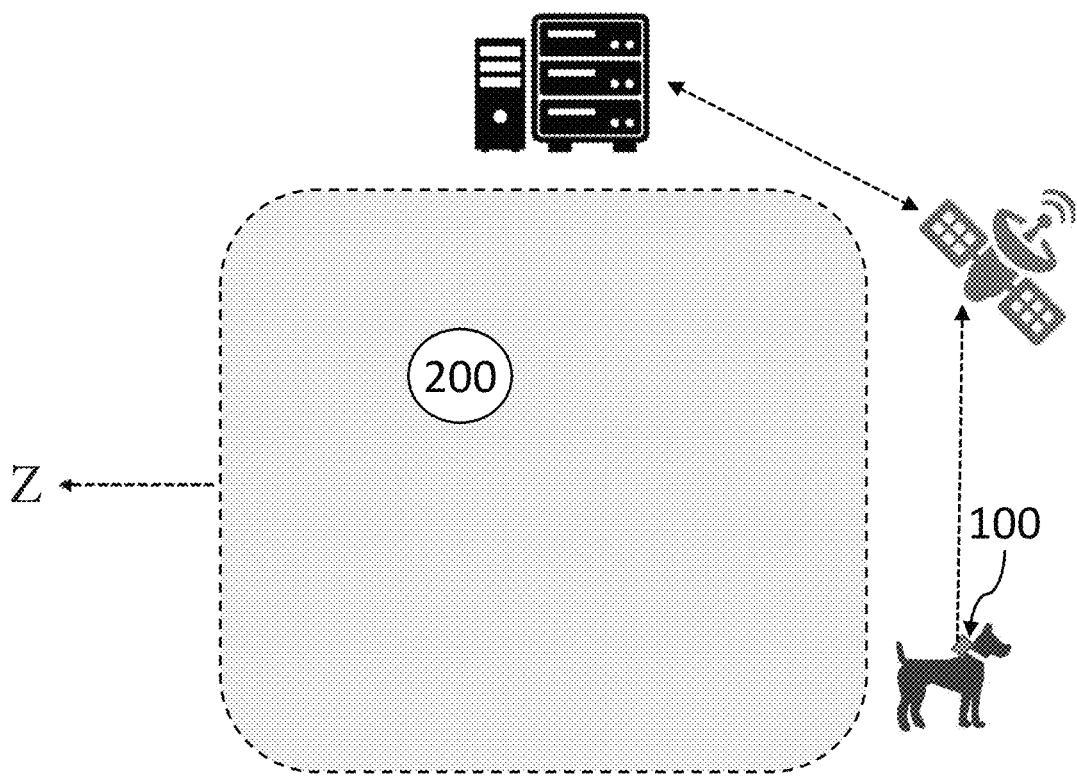
FIG. 27 is a schematic illustration of the collar assembly 100 shown during use outside a containment zone Z.
Figure 28:
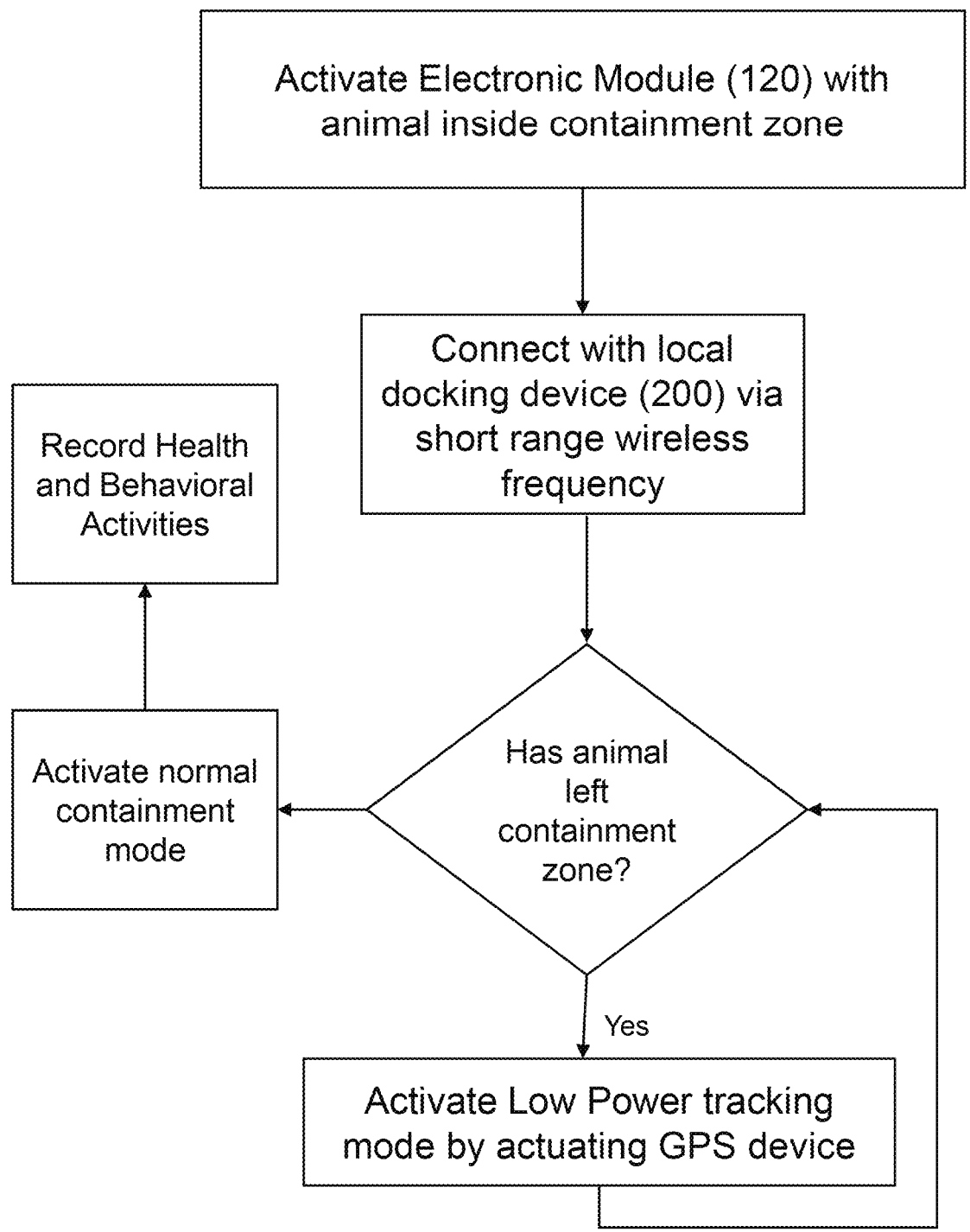
FIG. 28 is a flowchart illustrating the method steps undertaken during operation of the collar assembly 100.

Referring to FIGS. 26 and 27, the microprocessor M/P is configured to activate a location tracking device G when the electronic module 120 can no longer connect with the local docking station 200 as a result of being outside the containment zone Z. The activation of the tracking device G is also accompanied by operating the microprocessor M/P in a low power consumption mode. In this low power consumption tracking mode, the tracking device G works in conjunction with the microprocessor in the low power consumption mode to communicate directly with low earth orbit satellites by transmitting direct one-way data messages related to the animal's location.

As shown in FIGS. 26 and 27, containment zone Z is a fenced area within which the docking station 200 can maintain short range wireless communication with the electronic module 120. The containment zone Z is surrounded by a tracking zone which surrounds the containment zone Z. The tracking zone may represent virtually the entire geographic area outside the containment zone. In some embodiments, one or more docking stations 200 with a plurality of transmitters may be positioned within the perimeter of a containment zone Z.

Whilst, FIG. 17 shows only once microprocessor (M/P) this feature is not limiting. For example, the electronic module 120 may include two separate printed circuit boards (PCBs) with separate circuit board powering the Tracking device in the previously mentioned low power configuration. It is also envisioned that the Tracking device may be powered by a separate battery for powering the separate PCB in the low power consumption.

The electronic module 120 in the collar assembly operates in normal mode as long as the animal remains within the containment zone Z. Should the animal escape the containment zone Z, the PCB powering the normal mode of operation may trigger the tracking device G to become activated before deactivating operation in the normal mode. In at least some embodiments, the tracking device G and its own microprocessor may be integrated. One such example is the STX3 satellite transmitter manufactured by Globalstar. The STX3 is a low cost, OEM simplex module which sends one-way data messages via the Globalstar Simplex Network when integrated into the electronic module 120 of the animal collar assembly 100 and may be deemed suitable for delivering remote sensing, tracking and monitoring applications. Alternatively, two-way communication may be achieved by using the Globalstar Duplex communication system by incorporating the Duplex module within the electronic module within the electronic module 120.

As shown in the flowchart of FIG. 27, the electronic module 120 in the collar assembly 100 is first activated by the user in normal mode and used to monitor health and behavioural parameters of the dog within the containment zone Z which may be defined by a fence. When the docking station 200 is in communication with the electronic module 200, the collar assembly 100 continues to operate in the normal mode and transmits important sensor data back to the docking station. During such periods of operation, the tracking device G may remain inactive. The one or more docking stations 200 may operate individually or collectively to monitor and track the location of the animal within the containment zone Z. As long as the animal remains within the containment zone Z, i.e., has not escaped, step, the electronic module 120 continues to operate in the normal mode. If the animal escapes the containment area, the tracking device G is powered up, and the normal mode of operation stops. The step of determining whether the animal has escaped the containment zone may be determined by several methods. In one non-limiting method, the docking station 200 may periodically transmit one or more unique signals via short range communication using radio frequency. When the electronic module 120 is within the containment zone Z, the electronic module will receive the feedback which in turn would maintain the operation of the electronic module in the normal mode.

Once the tracking device G has been powered up, data packets including information about the animal's location are transmitted to low earth orbit satellites. Information from the satellites may be transmitted to a remotely located server. A concerned animal owner may therefore be able to access location data for the lost animal from the remotely located server. If the animal returns to the containment zone Z, the return of the electronic module 120 within the containment zone will activate the normal mode of operation for the electronic module 120.

When in tracking mode, the tracking device G uses substantially lower levels of power by sending data packets directly to the low earth orbit satellites as a result of which the lost or displaced animal's location can be tracked in real time. Moreover, the use of a low power mode of consumption improves battery life and allows the lost animal to be tracked over prolonged periods especially where the lost animal may remain lost for days if not months. The real time tracking data may be viewed on a smart device such as a computer, tablet, cell phone, etc. that is used by the user to see the animal's location. The presently described electronic module 120 as previously discussed, suspends the normal mode of operation and may stop monitoring some (but not all) health and behavioural characteristics in the tracking mode of operation thereby conserving some of the battery capacity of the rechargeable batteries RB powering the electronic componentry in the electronic module 120.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

The invention claimed is:

1. An animal collar assembly for monitoring an animal's behaviour and/or animal's health and/or animal's location, the animal collar assembly comprising:

a collar configured to be passed around a neck region of an animal;

an electronic module comprising:
- a housing enclosing electronic componentry therein; and
- a rechargeable battery powering the electronic componentry;
- a pair of opposed slots for receiving a strap of the collar therein, wherein each of said opposed slots is defined by a tab member spaced away from a portion of the electronic module housing;
- one or more probes positioned on an outer surface of each tab member;

a coupling member configured to couple to the collar;

a lock, wherein the lock comprises:
- a locking formation disposed on the coupling member;
- a recessed portion disposed on the housing for receiving and locking the locking formation;

wherein twisting the electronic module in a clockwise or counter-clockwise direction uncouples the electronic module from the collar strap;

a counterweight module having a weight equal to or greater than a weight of the electronic module, the counterweight module comprising a second coupling member configured to couple the counterweight module to the collar;

wherein the first coupling member and the second coupling member allows the counterweight module and the electronic module to be coupled at a plurality of spaced apart coupling locations along a length of the collar strap.

2. The animal collar assembly in accordance with claim 1, wherein the one or more probes are positioned on the housing such that, upon coupling of the electronic module with the collar strap, the probes are arranged to directly contact a body of the animal for sensing one or more health parameters of the animal.

3. The animal collar assembly in accordance with claim 2, wherein the one or more probes contact a skin of the animal when coupled with the collar strap.

4. The animal collar assembly in accordance with claim 2, wherein each of the probes further comprises a connector for electrically connecting the rechargeable battery to a charging device.

5. The animal collar assembly in accordance with claim 1, wherein the electronic module is fixedly attached to the collar strap to prevent relative movement between the collar strap and the electronic module.

6. The animal collar assembly in accordance with claim 1, wherein the counterweight module comprises an outer surface adapted to display information or indicia related to the animal.

7. The animal collar assembly in accordance with claim 1, wherein the electronic module comprises a location tracking device configured to wirelessly transmit animal location data from the electronic module to a remotely located device to provide remote animal location tracking capability for the remotely located device.

8. The animal collar assembly in accordance with claim 7, wherein the location tracking device is configured to be operationally inactive when the electronic module of the collar assembly is located within a pre-defined containment area.

9. The animal collar assembly in accordance with claim 8, wherein the electronic module comprises a microprocessor that is operable in a normal containment operating mode to communicate information related to the animal behaviour whilst the location tracking device is operationally inactive.

10. The animal collar assembly in accordance with claim 9, wherein the microprocessor is in communication with a local short range transmission device to wirelessly transmit the information related to the animal behaviour wirelessly to a receiving device located within the containment area.

11. The animal collar assembly in accordance with claim 10, wherein the microprocessor is operable in a low power location tracking mode to process and transmit animal location related data when the electronic module of the collar assembly is located outside the pre-defined containment area.

12. The animal collar assembly in accordance with claim 7, wherein the location tracking device comprises a satellite transmitter arranged to be in communication with the microprocessor to transmit signals to one or more low earth orbit (LEO) satellites.

13. The animal collar assembly in accordance with claim 12, wherein the satellite transmitter is configured to transmit one-way data messages in relation to animal location from the electronic module to the one or more low earth orbit satellites.

14. The animal collar assembly in accordance with claim 12, wherein the satellite transmitter is configured to transmit two-way data messages in relation to animal location from the electronic module to the one or more low earth orbit satellites.

15. The animal collar assembly in accordance with claim 1, further comprising a sensor array with one or more sensor elements configured to communicate with a microprocessor, the sensor array including at least an accelerometer sensor, the accelerometer configured to measure at least one accelerometer-measured parameter of the animal from among: resting patterns, activity patterns, movement patterns and position patterns.

16. The animal collar assembly in accordance with claim 15, wherein the sensor array further comprises at least one non-accelerometer sensor configured to measure at least one of the following non-accelerometer-measured parameters of the animal: temperature, pulse rate, respiration rate.

17. An animal collar assembly in accordance with claim 15, wherein one or more local or remotely located processors are configured to receive data related to measured parameters of the animal from the sensor array and process said data by comparing the measured parameters with reference data to determine a likelihood of a specific health related condition in the animal and to provide an indication of said likelihood on a display provided on the collar housing or on a remotely located device in communication with said electronic module.

18. The animal collar assembly in accordance with claim 17, wherein the determination of likelihood of the specific health related condition of the animal is carried out by comparing the measured parameters with one or more pre-set or pre-determined threshold values.

19. The animal collar assembly in accordance with claim 17, wherein the local or remotely located processors are configured to communicate with a user input interface for receiving user input to program measurement of one or more of said health related parameters.

* * * * *